United States Patent

[11] 3,634,604

| [72] | Inventor | George E. Lusk |
| | | Downers Grove, Ill. |
| [21] | Appl. No. | 88,152 |
| [22] | Filed | Nov. 9, 1970 |
| [45] | Patented | Jan. 11, 1972 |
| [73] | Assignee | G & W Electric Specialty Company |
| | | Blue Island, Ill. |
| | | Continuation-in-part of application Ser. No. 836,431, June 25, 1969, now abandoned. This application Nov. 9, 1970, Ser. No. 88,152 |

[54] CLOSED CELL ELASTOMERIC SPONGE POWER CABLE TERMINATOR
8 Claims, 3 Drawing Figs.

[52] U.S. Cl. ......................................................... 174/73 R
[51] Int. Cl. ......................................................... H02g 15/02
[50] Field of Search ............................................ 174/73 R, 73 SC, 75 D, 78, 80

[56] References Cited
UNITED STATES PATENTS

| 3,243,756 | 3/1966 | Ruete et al. | 174/73 R X |
| 3,290,428 | 12/1966 | Yonkers | 174/73 R |
| 3,317,654 | 5/1967 | Yonkers | 174/73 R |
| 3,318,992 | 5/1967 | Huber | 174/73 R |
| 3,335,215 | 8/1967 | Huber | 174/73 R |
| 3,351,703 | 11/1967 | Miller et al. | 174/73 R X |
| 3,352,962 | 11/1967 | Brown et al. | 174/73 R |
| 3,355,541 | 11/1967 | Hornberger | 174/73 R |
| 3,377,420 | 4/1968 | Brown et al. | 174/73 R |
| 3,378,627 | 4/1968 | Aldighieri | 174/73 R |
| 3,404,211 | 10/1968 | Nicholson | 174/73 R X |

FOREIGN PATENTS

| 1,408,279 | 7/1965 | France | 174/73 R |
| 1,042,590 | 9/1966 | Great Britain | 174/73 R |

*Primary Examiner*—Laramie E. Askin
*Attorney*—Hume, Clement, Hume & Lee

ABSTRACT: The closed cell elastomeric molded cone system of the invention essentially consists of a compressible dielectric material and thus, has the capability of accommodating a large range of cable diameters for a given cone size. Two sections of compressible elastomeric material, each having special properties, are bonded together to form the complete molded cone. The bonded cone assembly has the shape of a cylinder which matches the interior contour of its rigid insulator containment cup.

PATENTED JAN 11 1972
3,634,604
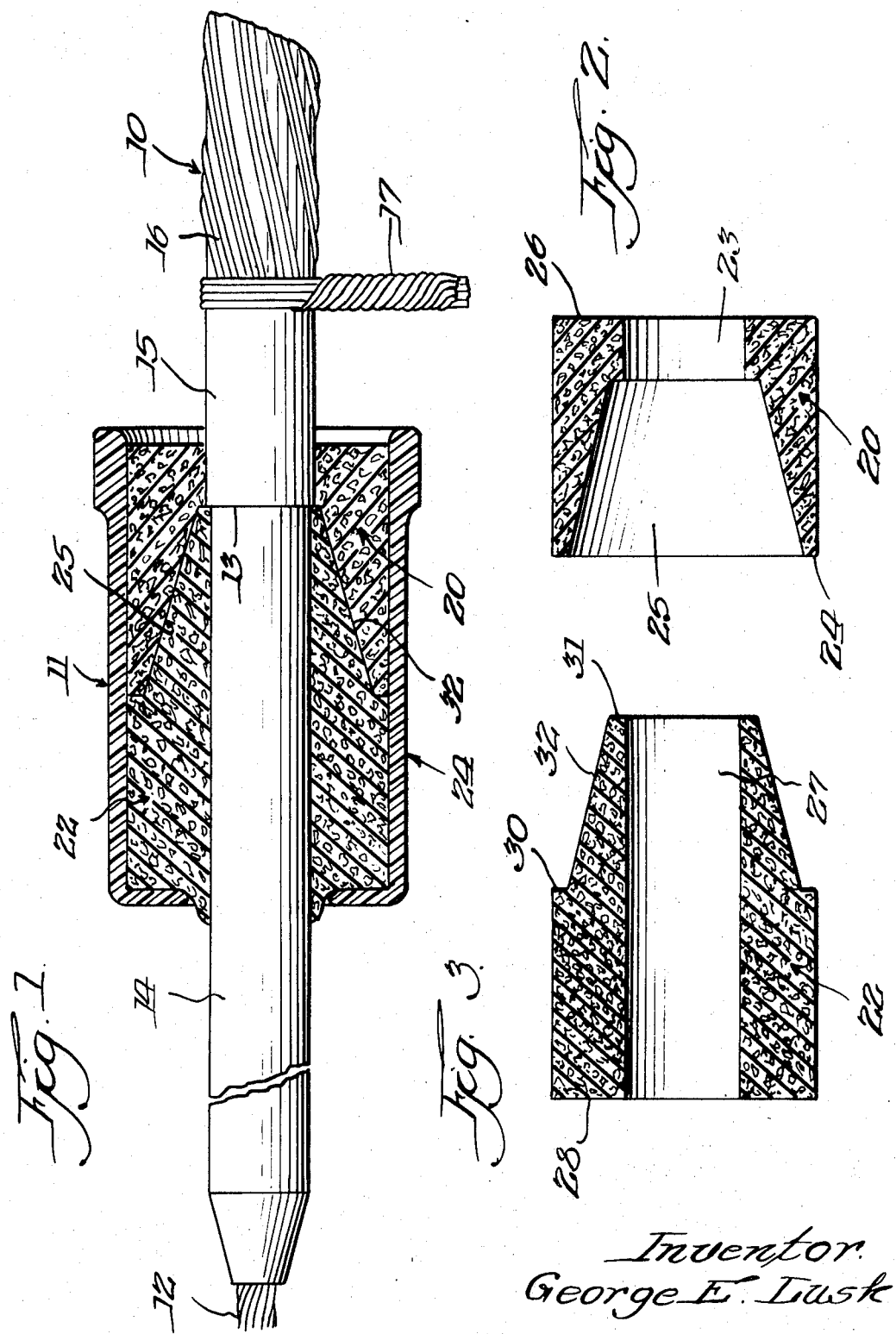
Inventor
George E. Lusk
By Hume Clement Hume & Lee
Attys.

CLOSED CELL ELASTOMERIC SPONGE POWER CABLE TERMINATOR

This application is a continuation-in-part of application Ser. No. 836,431, filed June 25, 1969, and now abandoned, for Closed Cell Elastomeric Sponge Indoor Power Cable Terminator.

The invention relates to high-voltage cable terminating devices and has reference more particularly to a power cable terminator of either the indoor class or the outdoor class which essentially consists of a molded compressible cone housed in a rigid insulator cap or housing to provide mechanical stability to the cone system.

High-voltage cable terminations are usually classified according to the operating environment to which they will be exposed. Most termination systems are installed in the atmosphere and hence would be included in the outdoor classification. The outdoor class is designed to withstand the degradation effects of wind, precipitation, ultraviolet radiation and airborne contamination. The indoor class, since it is protected from the major atmospheric exposure effects, will in most applications incorporate the use of lower cost materials and process systems consistent with those less destructive environments.

The difference in design between outdoor and indoor classes of cable terminators is most evident in regards to those devices terminating nonhygroscopic insulated cables such as the elastomerics including butyl, silicone and ethylene propylene, and the polymerics such as polyethylene, polyvinyl chloride, and polypropylene, since these materials do not require protection from moisture absorption.

Nonhygroscopic indoor cable termination systems are heretofore constructed have consisted of a stress cone built up with hand-applied nonhygroscopic insulating tapes usually of a material in the same generic family of the cable insulation. The hand-applied tape stress cones, however, require both skill in their construction and considerable time to install. Other indoor terminations have consisted of factory-molded stress cones made of elastomers. The inside diameters of these cones are designed to provide an interference fit with the cable insulation surface when slid over the cable. The noncompressible characteristics of the elastomeric material used to make these molded stress cones and the relatively high force required to slide the cones over the cable, due to the interference fit requirement, has necessitated the matching of the cones to specific cable diameters. Thus, a large variety of cone sizes are required to cover the cable diameter range commercially available.

An object of the present invention is to provide a molded cone power cable terminator consisting of a compressible dielectric material which thus has the capability of accommodating a large range of cable diameters for a given cone size.

Another object of the invention resides in the provision of an indoor or an outdoor power cable terminator wherein the molded cone is made of two sections each of compressible elastomeric material, each having special properties and which are bonded together to form the complete molded cone. The bonded cone assembly has the shape of a cylinder which matches the interior contour of a rigid insulator cup which houses the same, thus providing mechanical stability to the cone system in addition to encasing the molded cone in a dielectric track-resistant shell.

A further and more specific object of the present invention is to provide an indoor or outdoor power cable terminator essentially consisting of two sections of elastomeric material bonded together wherein the base section consists of an elastomer purposely made electrically conductive and shaped to provide the desired dielectric field distribution in the insulating section of the cone and the cable insulation adjacent to the terminus of the cable shield, and wherein the other section consists of a molded dielectric compressible elastomer having a shape such that its lower section matches the shape of the conductive section.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts.

FIG. 1 is an elevational view of a power cable having the improved terminator device of the invention applied thereto and which is shown in section to illustrate the construction of the same;

FIG. 2 is a sectional view taken longitudinally through the center of the electrically conductive base section; and FIG. 3 is a sectional view taken longitudinally of the forward section which has interfitting relation with the base section.

Referring to the drawings, the power cable 10 as shown in FIG. 1 has the terminator of the invention applied thereto. The cable may be of the underground residential distribution type and the terminating device in telescoping relation on the cable is indicated in its entirety by the numeral 11. For receiving the terminating device, the terminal end of the cable must be prepared. This requires the stripping of the cable insulation to expose the center cable conductor which is preferably of aluminum or copper. The solid insulation 14 which surrounds and encases the cable conductor 12 is also exposed to an extent sufficient for accommodating the terminator by the removal of the cable-conductive shield 15 to a predetermined distance 13. Likewise, the outer neutral or shielding layer 15 is exposed since the wires 16 which encase the insulation of the cable are stripped back and gathered together in twisted form such as indicated by the numeral 17.

The installation of the terminator 11 on the insulation section 14 of the power cable merely requires that the prepared end of the cable be inserted through the bonded sections of the molded terminator as best shown in FIG. 1. A lubricant, such as silicone grease, can be applied over cable insulation to facilitate sliding the terminator over the cable insulation. The base section 20 of the two-part terminator consists of an elastomer which is purposely made electrically conductive and the same is shaped to provide the desired dielectric field distribution in the insulating section of the cone and the cable insulation adjacent to the terminus of the cable shield. The elastomer may be made electrically conductive in any suitable manner. One such manner is by the insertion of conductive carbon particles. An alternative manner of making the base section 20 conductive is by covering the molded elastomer with a conductive coating substance. One such substance is manufactured by the General Electric Company and is identified as General Electric Semiconducting Silicone Resin SR 531. The forward section 22 is shaped so that its lower end matches the shape of the conductive section and the completed assembly takes the shape of a cylinder which matches the interior contour of a tubular housing 24 formed of any suitable rigid insulating material such as plastic, ceramic, boro-silicate or acrylic resin. In the preferred embodiment of the invention, if the terminator 11 were to be used as an indoor terminator, the tubular housing or cup 24 would be formed from a suitable rigid plastic material. On the other hand, if the terminator 11 were to be used as an outdoor terminator, the tubular housing or cup 24 would be formed from conventional ceramic or glass material. Thus, a less expensive material may be used, if desired, for an indoor terminator than for an outdoor terminator since the terminator will not be exposed to the degradation effects of wind, precipitation, ultraviolet radiation and airborn contamination. However, it will be recognized by one skilled in the art that a ceramic housing for the terminator may be used for indoor use and a plastic housing for the terminator may be used for outdoor use if it is shielded in some other manner from the degradation effects of the outdoor environment. The base section 20 has the opening 23 formed therein for receiving the cable and the forward surface 24 is recessed to form the cavity 25 which tapers inwardly towards the bottom surface 26. The forward section 22 is formed with a longitudinal opening 27 which is aligned with opening 23 when the parts are bonded together providing the passage for the power cable. The forward portion of the section 22 is cylindrical from the forward surface 28 to the shoulder 30. From the shoulder 30 to the rear surface 31 the section tapers at 32 inwardly in a direction towards the central passage 27. The parts are assembled by inserting the tapering portion 32 in the cavity 25, the tapering walls of both parts being made complementary and, thus, the two sections of the terminator when in assembled relation form a cylindrical unit. The two sections 20 and 22 are bonded together in interfitting relation as shown in FIG. 1 and the resulting cylindrical unit is inserted within the rigid insulator housing 24 which gives mechanical stability to the terminator and in addition encases the two respective cone sections in a dielectric track-resistant shell.

The elastomer used to make the molded cones 20 and 22 has the desired compressibility characteristic since it consists of a closed cell sponge. The type of elastomer used, the size and distribution of the gas cells in the closed cell sponge are very important to the success of the termination system. An acceptable elastomer must have good relaxation and creep moduli. Satisfactory service life requires the maintenance of a tight interface between the molded cones and the cable insulation surface. A reduction of pressure exerted by the molded cones on the cable insulation surface will take place in time due to an inherent tendency for the elastomer to relax and further due to some loss of gas from the cells. The material selected must have the capability of exerting sufficient pressure over an extended period of time to be suitable for usage.

Also to be deemed acceptable, the elastomer employed must have superior corona cutting resistance. The cells of the sponge, since they are filled with a gas, will inherently have a lower ionization inception and extinction level than cell-free elastomer. Proper electrical design of the termination will insure an ionization inception and extinction level considerably in excess of the normal operating voltages. However, during periods of extreme overstress such as during lightning or abnormal switching surges, the gas in the cells can ionize. The time duration of these overvoltages is extremely short, from 40 microseconds to 0.016 seconds. It is desirable to have the elastomer resist or be immune to the deleterious effects of ionization during these overvoltages.

Good ozone resistance is also required of the elastomers used. In most electrical systems of the high-voltage category an appreciable amount of ozone is generated around exposed high-voltage terminals. The indoor terminations, since they are located in compartments having poor ventilation, experience a higher than average amount of ozone. The elastomer must have a capability of resisting these ozone levels for extended periods of time.

Excessive absorption of moisture or a high rate of cell gas loss can adversely affect the ionization inception and extinction levels associated with the gas space of the cells. The electric field will have some capability of rejecting moisture absorption, but during the time periods when the cable is not energized, the elastomeric material itself would have to limit the amount of moisture absorbed. It is, therefore, desirable to use an elastomer that is either hydrophobic or one which has a low moisture transmission rate. The relatively low exposed surface-to-volume ratio of the molded sections 20 and 22 and the molded skin will have a tendency to minimize moisture absorption.

In accordance with the present invention two elastomeric families have the properties meeting the above-discussed requirements. These two are the silicone and the ethylene-propylene elastomers.

The terminator 11 and the cable 10 to which it is applied will be operated at high voltages. This voltage will be divided between the cable insulation, the elastomer surrounding the closed cells, and the gas within the closed cell in proportion to the electrical susceptance of each. It is, therefore, desirable to have the susceptance of the cells at a low enough level in proportion to that of the cable insulation and the elastomer to keep the voltage gradient across the cells within acceptable limits. Since the dielectric strength of a gas filled space is inversely proportional to the diameter of the space, the maintenance of small-sized cells both lowers the susceptance of the cells and increases their dielectric strength. However, to maintain the desired level of compressibility, the size of the cells should not be reduced excessively nor is it desirable to reduce the ratio of cell volume to total volume. Hence, the acceptable cell size range and the number of cells per unit volume is relatively narrow. For the present the tests indicate that closed cell silicone rubber sponge with a density of 0.019 lbs. per cubic inch with maximum cell diameters of from 0.40 to 0.55 millimeters has the dielectric strength and ionization inception and extinction levels desired. Closed cell ethylene-propylene sponge with a density of 0.009 lbs. per cubic inch and with cell diameters of from 0.32 to 0.21 millimeters has also been found entirely acceptable as elastomeric material for the sections 20 and 22 of the present terminator.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A power cable terminator comprising a base section and a forward section bonded together in interfitting relation to form a cylindrical unit, a tubular housing of rigid insulator material in surrounding relation with the cylindrical walls of the unit, whereby to provide mechanical stability to the bonded sections, and each section having an opening extending through the same permitting passage of the cable, both of said sections consisting of a compressible closed cell elastomeric sponge, and the elastomeric sponge material of said base section being purposely made electrically conductive.

2. A power cable terminator as defined by claim 1, wherein the base section is shaped to provide the desired dielectric field distribution in the insulating section of the bonded unit and the cable insulation adjacent to the terminus of the cable shield.

3. A power cable terminator as defined by claim 1, wherein the base section has an opening disposed longitudinally therein and contiguous to a tapering cavity also formed in the base section in alignment with the opening, and wherein the forward section includes a cylindrical forward part and a tapering part which has interfitting relation with the cavity of the base section, said forward section also having an opening extending longitudinally thereof and which aligns with the opening in the base section when the sections are in assembled interfitting relation for receiving the power cable to which the terminator is to be applied.

4. A power cable terminator comprising a base section formed of a compressible closed cell elastomeric sponge and which is electrically conductive, said base section having an opening extending longitudinally and a cavity formed therein in alignment with and contiguous to the opening, the cavity having a shape which tapers inwardly toward its base end, a forward section also consisting of a compressible closed cell elastomeric sponge and which has a tapering exterior part interfitting with the cavity in the base section, said forward section also having an opening extending longitudinally thereof and which aligns with the opening in the base section, said sections being assembled into a cylindrical unit, and a tubular housing of rigid insulator material in surrounding relation with the cylindrical walls of the unit.

5. A power cable terminator as defined by claim 4, wherein the closed cell elastomeric sponge material of the base and forward sections consists of a silicone elastomer.

6. A power cable terminator as defined by claim 4, wherein the closed cell elastomeric sponge material of the base and forward sections consists of an ethylene-propylene elastomer.

7. A power cable terminator as defined by claim 4, wherein the closed cell elastomeric sponge material of the base and forward sections consists of a silicone elastomer having a density of approximately 0.019 lbs. per cubic inch with maximum cell diameters of from 0.40 to 0.55 millimeters.

8. A power cable terminator as defined by claim 4, wherein the closed cell elastomeric sponge material of the base and forward sections consists of an ethylene-propylene elastomer having a density of approximately 0.009 lbs. per cubic inch with maximum cell diameters of from 0.32 to 0.21 millimeters.

* * * * *